(No Model.)
M. ANDERSON.
SWINGING GATE.
No. 482,218. Patented Sept. 6, 1892.
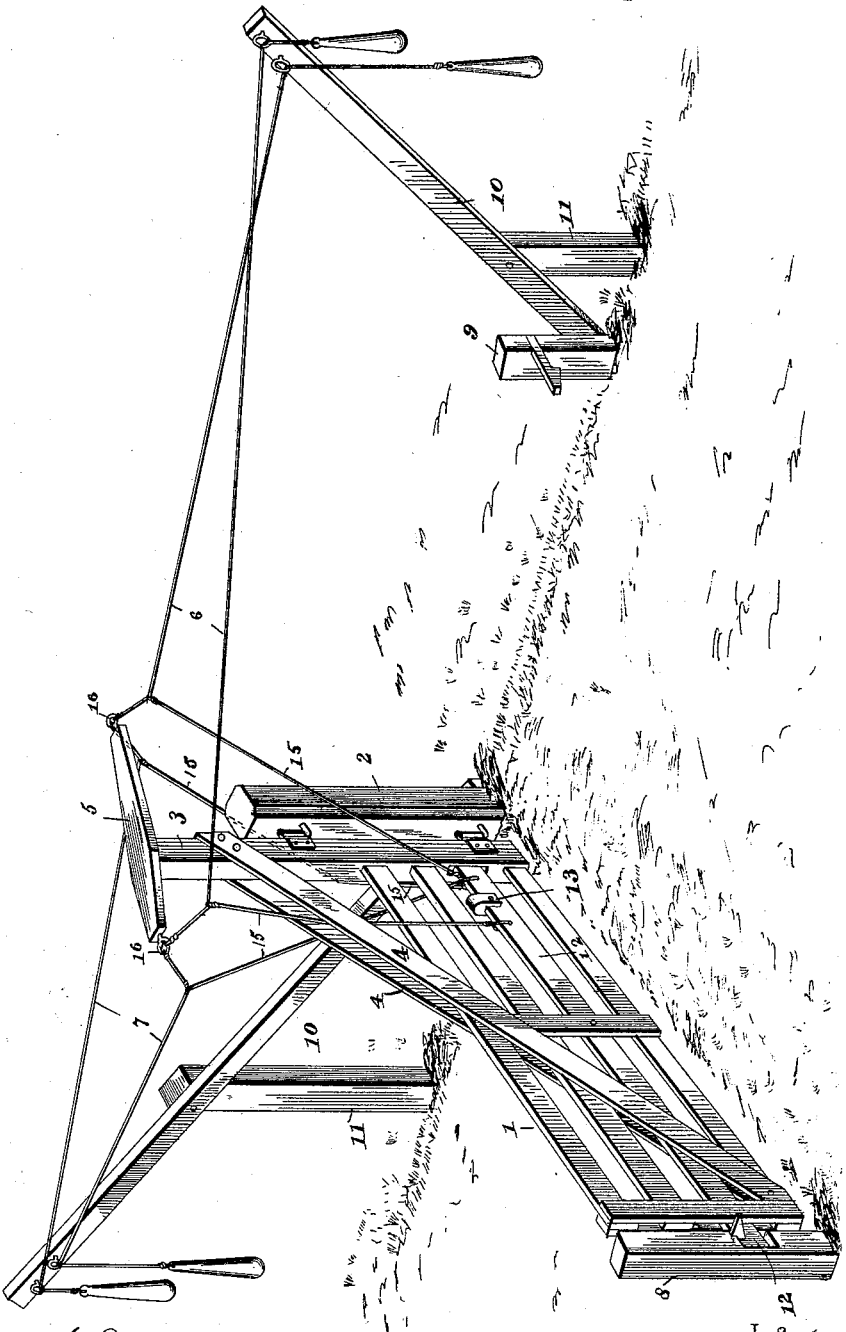
Witnesses
Inventor
Martin Anderson.
By his Attorneys,

UNITED STATES PATENT OFFICE.

MARTIN ANDERSON, OF HENDERSON STATION, ILLINOIS.

SWINGING GATE.

SPECIFICATION forming part of Letters Patent No. 482,218, dated September 6, 1892.

Application filed April 25, 1892. Serial No. 430,515. (No model.)

*To all whom it may concern:*

Be it known that I, MARTIN ANDERSON, a citizen of the United States, residing at Henderson Station, in the county of Ford and State of Illinois, have invented a new and useful Swinging Gate, of which the following is a specification.

The invention relates to improvements in swinging gates.

The object of the present invention is to simplify and improve the construction of swinging gates and the means for operating the same and to enable them to be readily opened and closed at a distance from them without necessitating dismounting from a vehicle or horse.

The invention consists in the construction and novel combination and arrangement of parts hereinafter fully described, illustrated in the accompanying drawing, and pointed out in the claim hereto appended.

The drawing is a perspective view of a gate constructed in accordance with this invention, the gate being partially open.

Referring to the drawing, 1 designates a gate hinged to a post 2 and having its inner end bar 3 extended above said post and supported by inclined braces 4 and provided at its top with a horizontal bar 5, to the ends of which are attached operating-ropes 6 and 7, extending in pairs from the gate in opposite directions. The gate opens only one way from a latch-post 8 to a supplemental latch-post 9, and one cord of each pair is employed for opening the gate and the other for closing it by turning the cross-bar 5, as will be readily understood. The outer ends of the operating-ropes are provided with weighted handles and are supported by inclined bars 10, which are braced by posts 11 and extend to suitable distances from the gate.

The gate is provided with a latch-bar 12, which is pivoted between its ends and has its inner end provided with a weight 13. Its outer end is adapted to engage under the keepers of the latch-posts, the weight holding it in such engagement. The weight is provided with a recess or bifurcation to receive the latch-bar. The latch is released when it is desired to open or close the gate by the operating-ropes, which are connected with its inner end by latch-ropes 15, having their lower ends secured to the latch-bar and their upper ends to the operating-ropes, and by pulling the latter the inner end of the latch-bar is raised.

It will be seen that the gate is simple and inexpensive in construction and that it is adapted to be readily operated at a distance from either side of it. The inner ends of the pairs of operating-ropes are secured to eyes 16 at the ends of the horizontal bar 5, the ropes of each pair being connected to opposite ends of the horizontal bar.

What I claim is—

The combination of a swinging gate having its inner end bar extended vertically and provided at the upper end with a horizontal bar disposed at an angle to the gate, the inclined supporting-bars arranged at each side of the gate and extending upward and outward, the operating-ropes arranged in pairs and extending in opposite directions from the gate, each pair having its outer ends supported by an inclined bar and having its inner ends secured to the horizontal bar at opposite ends thereof, the pivoted latch-bar mounted on the gate and provided at its inner end with a weight, and the latch-ropes arranged in pairs at each side of the gate and having their lower ends secured to the latch-bar and their upper ends attached to the operating-ropes, substantially as described.

In testimony that I claim the foregoing as my own I have hereto affixed my signature in the presence of two witnesses.

MARTIN ANDERSON.

Witnesses:
M. L. McQUISTON,
DAVID C. SWANSON.